(12) United States Patent
Plut

(10) Patent No.: US 8,961,865 B2
(45) Date of Patent: Feb. 24, 2015

(54) TORCH TIP PROTECTOR

(71) Applicant: Travis J. Plut, Hutchinson, MN (US)

(72) Inventor: Travis J. Plut, Hutchinson, MN (US)

( * ) Notice: Subject to any disclaimer, the term of this patent is extended or adjusted under 35 U.S.C. 154(b) by 203 days.

(21) Appl. No.: 13/689,706

(22) Filed: Nov. 29, 2012

(65) Prior Publication Data

US 2014/0145380 A1    May 29, 2014

(51) Int. Cl.
  *B23K 7/00*  (2006.01)
  *F23D 14/38*  (2006.01)
  *F23D 14/46*  (2006.01)

(52) U.S. Cl.
  CPC . *B23K 7/00* (2013.01); *F23D 14/38* (2013.01); *F23D 14/465* (2013.01); *Y10S 266/902* (2013.01)
  USPC .............................. 266/48; 266/902; 431/350

(58) Field of Classification Search
  CPC ........................................................ B23K 7/00
  USPC .................... 266/48, 902; 431/350
  See application file for complete search history.

(56) References Cited

U.S. PATENT DOCUMENTS

| | | | | |
|---|---|---|---|---|
| 1,709,404 | A * | 4/1929 | Bruno | 431/344 |
| 2,079,170 | A * | 5/1937 | Horsley | 206/499 |
| 3,375,090 | A | 3/1968 | Marra, Jr. | |
| 4,585,410 | A | 4/1986 | Baker et al. | |
| 4,891,489 | A | 1/1990 | Bollinger et al. | |
| 5,741,128 | A | 4/1998 | Tsai | |
| 5,856,647 | A | 1/1999 | Luo | |
| 2010/0255436 | A1* | 10/2010 | Lu | 431/350 |

* cited by examiner

*Primary Examiner* — Scott Kastler
(74) *Attorney, Agent, or Firm* — Albert W. Watkins

(57) ABSTRACT

A torch tip protector is elastically retained to an oxyacetylene cutting torch tip during transport. The torch tip protector in the preferred embodiment has a protector cap having a generally disc-shaped base and a truncated conical side wall that together form a cup or thimble-shaped torch tip cover. This torch tip cover operatively encompasses a torch tip and thereby operatively blocks access and fouling of the torch tip. To ensure that the protector cap stays engaged with torch tip, a hook secures to and is manually removable from at least one of the torch gas lines. A spring couples to the hook and couples with the protector cap to provide an elastic tension force that draws the protector cap towards hook and thereby secures the protector cap onto the torch tip.

12 Claims, 2 Drawing Sheets

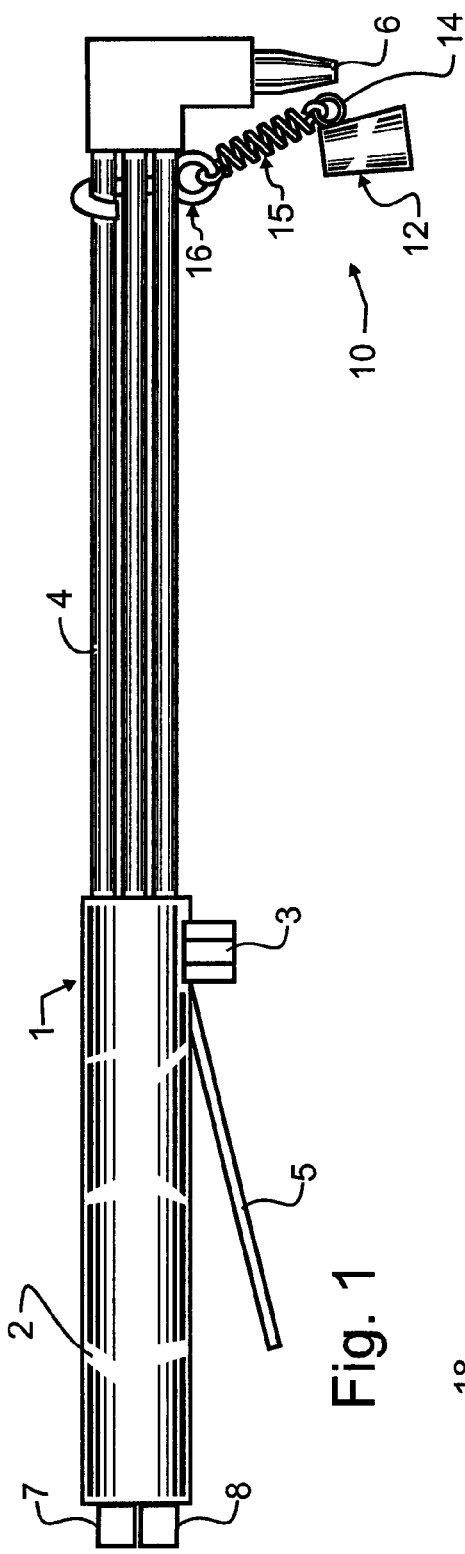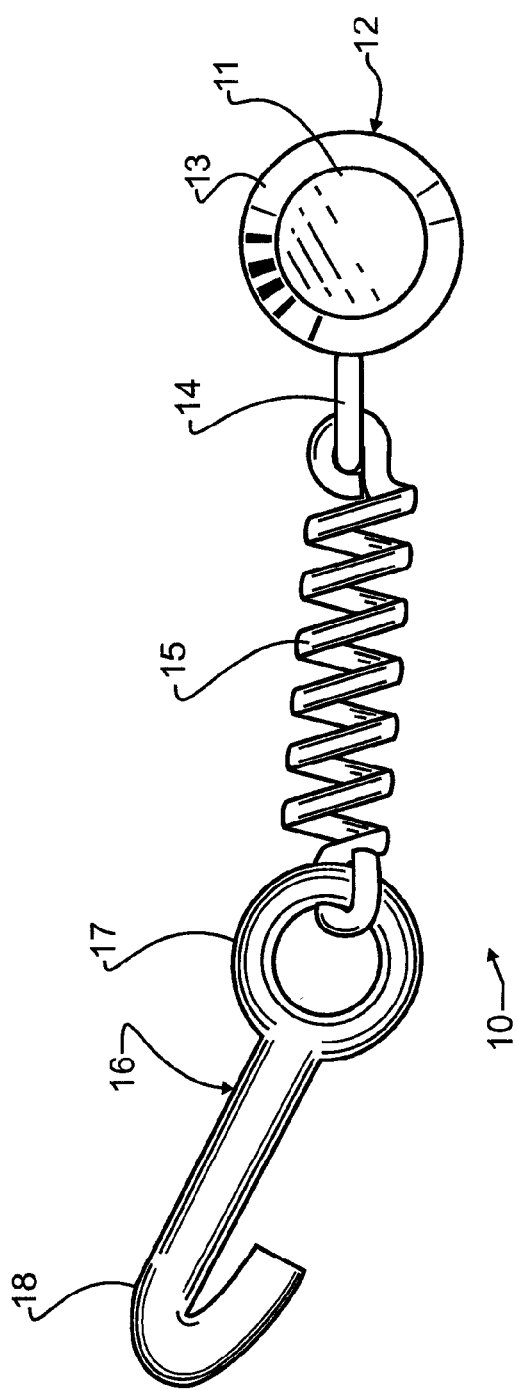

TORCH TIP PROTECTOR

BACKGROUND OF THE INVENTION

1. Field of the Invention

This invention pertains generally to the field of gas cutting torches such as the well known and widely used oxy-acetylene torches. More particularly, the present invention is a gas torch tip protector that allows the torch to be handled and used in more rugged and extreme environments than was heretofore possible.

2. Description of the Related Art

Nearly from the beginnings of the bronze age, mankind has pursued better ways to work with metal. Metal working has in no small part included ways of bonding together and separating metals. One early bonding technique involved the creation of lower melt alloys that could be used to braze metal together. Brazing and soldering are quite effective for relatively soft and malleable materials such as copper. However, with the iron age came much harder and stronger steel compositions. The strength of a brazed or soldered connection is in most cases far weaker than the intrinsic strength of steel. Consequently, brazing is for many steel applications inadequate. Understandably then, with the improvements in metals have come many additional improvements in bonding and separating.

One quite old technique for bonding and separating metals is the use of a torch. While there were early single gas torches that burned various combustible materials to generate heat, over time certain chemicals were developed that offered more capability and flexibility. Premier among these are acetylene torches that combust acetylene gas with oxygen gas. These torches, which were invented more than a century ago, still remain the most commonly used type of torch. They are capable of burning at extremely high temperatures of approximately 6,000 degrees Fahrenheit, which is sufficient to easily melt and bond many metals, including all common steel alloys. Furthermore, the gases may be stored in relatively small canisters or cylinders, and are readily and, with minimal proper preparation, quite safely and easily transported. No energy source is required to operate the torch other than a hand-held sparker or igniter that is used to ignite the gases. The oxyacetylene torch may further be used in nearly any environment, meaning adverse weather does not inhibit the use of the torch. The self-contained nature, relative ease of transport, and ability to operate in adverse weather means the oxyacetylene torch can be used in environments that are not able to support the operation of the many newer and more sophisticated torches. For example, various arc, Metal-Inert-Gas (MIG), Tungsten-Inert-Gas (TIG) and plasma welders have been developed that have great utility, but these types of welders are generally significantly bulkier than an oxyacetylene torch, are less resistant to adverse weather and environment, and they require access to relatively high power electrical sources, some even requiring an industrial three-phase power source. Since many job sites are not sheltered from the weather or have ready access to high power electrical connection, these newer welding apparatus are limited to use within an adequately wired and sheltered work shop or the like.

While oxyacetylene torches have been very beneficial in welding together metals such as steel, these torches also enable another very useful process for separating steel. When an oxyacetylene torch is used for cutting, a modern cutting torch tip will commonly include a plurality of smaller orifices surrounding a central jet. The smaller orifices carry a mix of oxygen and acetylene, and this mix is used to preheat the steel to a cherry-red. Then the operator presses a trigger that opens the flow of oxygen through the larger central jet orifice in the torch tip, substantially increasing the flow of oxygen relative to acetylene. This makes the torch extremely oxidizing. The large flow of oxygen through this larger central jet introduces the excess oxygen to the heated steel, causing the steel to literally burn and release a great deal of additional heat. The excess oxygen forms iron oxide that has a melting point much lower than that of steel. Consequently, this molten iron oxide is removed from the metal substrate simply by the pressure from the gas flow. This means that the torch can be switched from a neutral or even slightly reducing mix of oxygen and acetylene for heating, welding or bonding to an oxidizing flame that is very oxygen rich. This can be done at will by the welder, allowing the torch to be used not only for bonding but also for cutting. As may be understood then, this technique is extremely energy and time efficient for cutting steel, making the oxyacetylene torch preferred for most cutting torches, and far more efficient at cutting heavier steel than other techniques. The oxyacetylene torch is still today, more than a century after development, one of the most flexible and useful tools in steel working.

While there have been oxyacetylene torches for more than a century, and while these torches are often the tool of choice for remote job sites or for cutting steel, they do suffer from one vexing limitation. The orifices in the torch tip, particularly the smaller orifices surrounding the central jet but also including the central jet, may be easily clogged with dirt if the torch tip is allowed to drag on the ground. However, and as already noted herein above, adverse work environments are best suited for this type of torch. Consequently, all too commonly a welder will unintentionally drag the torch tip, such as when climbing into or out of a depression or hole in the ground or when otherwise transporting the torch. In such case, the torch may not perform optimally, and the operator may lose significant time either cleaning or replacing a clogged or damaged torch tip. In spite of the more than one hundred years of use of the oxyacetylene torch, this still today remains an unresolved problem in the field of cutting torches for welders.

U.S. Pat. No. 3,375,090 by Marra Jr, entitled "Protective devices for torch tips"; and U.S. Pat. No. 4,585,410 by Baker et al, entitled "Torch tip saver", the teachings and contents which are incorporated herein by reference, describe torch tip protectors that help to shield torch tip orifices from cutting debris, while simultaneously protecting against damage to the torch tip if the tip is accidentally rapped against a hard surface. Unfortunately, these torch tip devices are open to the torch tip orifices, and so do not prevent debris from clogging the torch tip during transport.

In the broader field of torches, including single gas torches and electrical plasma torches, there have been a number of additional patents on protectors for torch tips. Exemplary U.S. patents, the teachings and contents of each which are incorporated herein by reference, include U.S. Pat. No. 4,891,489 by Bollinger et al, entitled "Shield cup protector apparatus for plasma arc torch"; and U.S. Pat. No. 5,856,647 by Luo, entitled "Drag cup for plasma arc torch". Similar to the Marra and Baker et al patent, these patents are also open to the torch tip, and are installed during torch operation, protecting the torch tip against accidental impact and other useful benefit but failing to protect the torch tip during transport.

Another U.S. Pat. No. 5,741,128 by Tsai, entitled "Hand gas torch", the teachings and contents which are incorporated herein by reference, describes a small hand-held single gas torch such as might be used for hobby brazing, combusting, or heating processes. This type of torch will reach much lower temperatures than that of an oxyacetylene or other dual gas torch. The Tsai torch includes a nozzle cap that is connected by a chain, and is used to cover the flame nozzle assembly when the hand gas torch is not in use. While the illustrated cover is undoubtedly of great utility in the single gas torch, there is little teaching for the application to oxyacetylene torches. The Tsai torch tip cover is cylindrical, meaning that it must have relatively close tolerances on the inside diameter to properly form a friction engagement with the outer tube of the flame nozzle assembly. For a hobby torch that is used primarily for relatively lower temperature heating or combusting, and which is transported in a clothing pocket, this is quite viable. However, in using an oxyacetylene cutting torch, the oxyacetylene torch tip is exposed to occasional bits of molten metal or slag that can stick to the torch tip, and the oxyacetylene torch tip, as aforementioned, may be dragged along the ground or the like. Furthermore, the extremely high temperatures generated by the oxygen and acetylene combustion will heat any outer tubes around the flame nozzle assembly or torch tip, and without the use of very expensive materials will lead to deformation of the metal from repeated heating and cooling. Consequently, a torch tip cover such as illustrated by Tsai will only have utility in an oxyacetylene torch when the torch tip is new, and will no longer be operative once the cutting torch has been used.

In addition to the aforementioned patents, Webster's New Universal Unabridged Dictionary, Second Edition copyright 1983, is additionally incorporated herein by reference in entirety for the definitions of words and terms used herein.

SUMMARY OF THE INVENTION

In a first manifestation, the present invention is, in combination, an oxygen and acetylene cutting torch and a torch tip protector. The oxygen and acetylene cutting torch comprises a source of oxygen torch gas, and a source of acetylene torch gas. A conical torch tip has a plurality of ports through which the oxygen and acetylene torch gasses pass and exit the gas torch prior to combustion. An oxygen gas line couples the oxygen gas source with the torch tip. An acetylene gas line couples the acetylene gas source with the torch tip. An oxygen cutting gas line couples the oxygen gas source with the torch tip. The torch tip protector has a protector cap having a generally disc-shaped base and a truncated conical side wall, the truncated side wall in combination with the disc-shaped base defining an open-topped cup. The truncated conical side wall operatively engages the conical torch tip and thereby securely engages thereto. In this engaged position, the disc-shaped base and conical side wall enclose and isolate the torch tip orifices from the environment. A hook operatively secures to and is manually removable from at least one of the oxygen gas line, acetylene gas line, and oxygen cutting gas line. A spring couples the hook with the protector cap and thereby operatively retains the protector cap on the conical torch tip during transport when the hook is operatively secured to the at least one of the oxygen gas line, acetylene gas line, and oxygen cutting gas line, and the protector cap is operatively engaging the conical torch tip.

In a second manifestation, the present invention is a conical torch tip protector. A cap has a conical body terminating at a first end with a generally disc-shaped base and is open at a second end distal to the disc-shaped base to operatively engage with a conical torch tip. A coupler operatively secures to and is manually removable from a torch. An elastic member couples the coupler with the cap and thereby operatively retains the cap on a conical torch tip during transport.

In a third manifestation, the present invention is a gas torch that has a source of torch gas, a torch tip through which the torch gas passes and exits the gas torch prior to combustion, and at least one gas line coupling the gas source with torch tip. The improvement comprises a torch tip cover operatively encompassing the torch tip and thereby operatively blocking access to the torch tip, a coupler engaging with the at least one gas line, and an elastic member coupled with the coupler and distally thereto with the torch tip cover to elastically draw the torch tip cover into secure engagement with the torch tip.

OBJECTS OF THE INVENTION

Exemplary embodiments of the present invention solve inadequacies of the prior art by providing a torch tip protector that is elastically retained to an oxyacetylene cutting torch tip.

A first object of the invention is to shield and protect torch orifices when not in use. A second object of the invention is to enable the removal of the torch tip protector when the torch is to be used, to ensure that there is no obstruction or interference with torch operation. Another object of the present invention is to accommodate variances in torch tips that might occur either from different manufacturing or from usage. A further object of the invention is to enable one-handed and fluid attachment and removal of the torch tip protector. An additional object of the invention is to provide an apparatus that is suitably heat resistant to not be harmed by likely exposures to hot torch tips and other surroundings. Yet another object of the present invention is to achieve the foregoing objectives with a small, low cost, and easily manufactured apparatus.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIG. 1 illustrates a preferred embodiment combination cutting torch and torch tip protector designed in accord with the teachings of the present invention from a side elevational view, with the torch tip protector removed from the torch tip.

FIG. 2 illustrates the preferred embodiment torch tip protector of FIG. 1 from a bottom plan view looking directly into the cup-shaped protector cap.

DESCRIPTION OF THE PREFERRED EMBODIMENT

Figure 3:
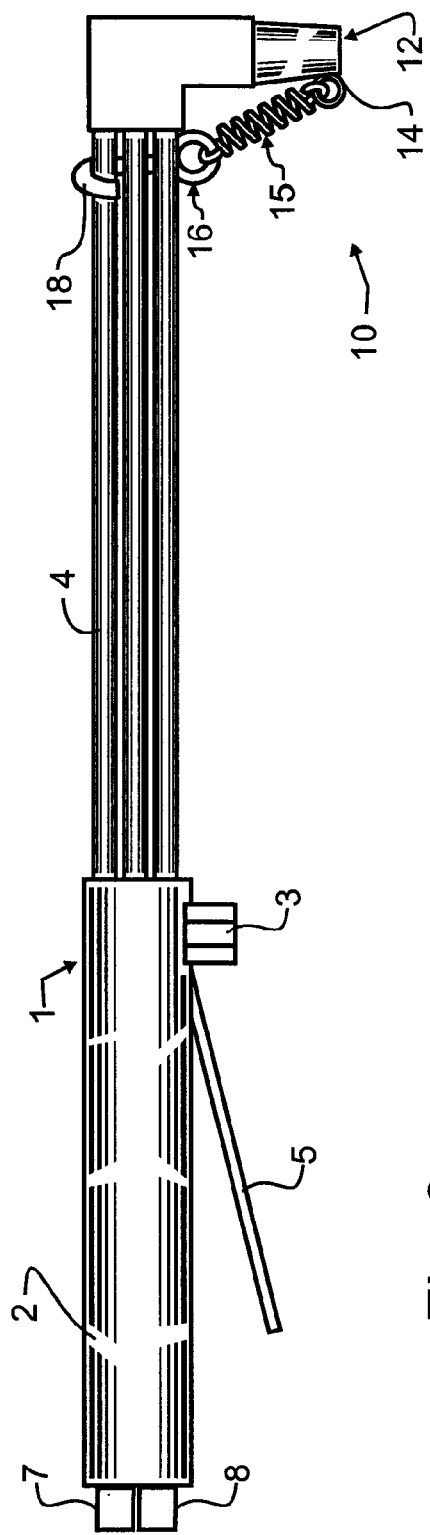
FIG. 3 illustrates the preferred embodiment combination cutting torch and torch tip protector of FIG. 1 from a side elevational view, with the torch tip protector engaged with and enclosing the torch tip.

Manifested in the preferred embodiment, the present invention provides a torch tip protector 10 that is elastically retained to an oxyacetylene cutting torch tip 6. Oxyacetylene cutting torch 1 is coupled to a source of oxygen torch gas 7 as is well-known in the art, and may for exemplary purposes comprise as a hose that couples to a regulator, the regulator in turn coupled through a shut-off valve to an oxygen tank. Oxyacetylene cutting torch 1 is also coupled to a source of acetylene torch gas 8 as is well-known in the art, and may for exemplary purposes comprise as a hose that couples to a regulator, the regulator in turn coupled through a shut-off valve to an acetylene tank. A torch handle 2 may preferably include one or more adjustment valves 3 to permit control of the flow of one or more of the gases directly at torch handle 2. In addition, an oxygen blast trigger 5 will preferably be provided that enables a welder to easily turn on and off a flow of oxygen through a central orifice in cutting torch tip 6. Whether integrally formed or individually formed, in the preferred embodiment at least one and preferably three cutting gas lines 4 extend from torch handle 2 to torch tip 6. Three distinct cutting gas lines permits the separate flow of both oxygen and acetylene torch gases simultaneously to preheat the steel or other metal, and also permits the separate flow of oxygen for the oxygen blast necessary for cutting. Conical torch tip 6 incorporates a plurality of ports through which the oxygen and acetylene torch gasses pass and exit the gas torch prior to combustion, as is known in the art and illustrated for exemplary purposes by Marra, Jr. incorporated by reference herein above.

Torch tip protector 10 in the preferred embodiment has a protector cap 12 having a generally disc-shaped base 11 and a truncated conical side wall 13 that together form a torch tip cover operatively encompassing torch tip 6 and thereby operatively blocking access to torch tip 6. Truncated side wall 13 is preferably sealingly bonded to disc-shaped base 11, defining an open-topped cup or thimble shape. Truncated conical side wall 13 may optionally be shaped to correspond with the shape of torch tip 6, or may be configured to accommodate a variety of tips. Either way, when protector cap 12 is installed, protector cap 12 operatively engages conical torch tip 6 and thereby securely engages thereto. In this engaged position, disc-shaped base 11 and truncated conical side wall 13 will enclose and isolate torch tip 6 from the environment.

Unfortunately, torch tip will during operation be exposed to metal particles, and will expand and contract due to temperature changes. A friction fit with torch tip 6 is not practicable then, since the dimension of torch tip 6 will change significantly with splatter and from when torch tip 6 is hot, for exemplary purposes immediately after use, to when torch tip 6 is cold, such as during transport in cold weather. The use of a truncated conical side wall 13 assists in accommodating variances in dimension of torch tip 6. If torch tip 6 is temporarily enlarged due to being hot from operation, then protector cap 12 may not slide as far onto tip 6. As torch tip 6 cools, protector cap 12 may then be slid farther about torch tip 6. Similarly, should a particle become adhered to torch tip 6, protector cap 12 will simply not slide as far onto and about torch tip 6.

To ensure that protector cap 12 stays engaged with torch tip 6, a hook 16 operatively secures to and is manually removable from at least one of the gas lines 4, including oxygen gas line, acetylene gas line, and oxygen cutting gas line in the preferred embodiment. While a hook 16 is illustrated as preferred, hook 16 is operative as a coupler that engages with torch 1. Consequently, other suitable couplers may be used. Nevertheless, hook 16 is easily manipulated, and may be attached to and removed from gas line 4 using a single hand and in a single fluid motion, meaning hook 16 provides convenience that is preferred. Further, hook 16 is preferably reasonably durable and so not easily damaged if accidentally dropped or otherwise roughly handled.

A spring 15 couples to hook 16 at eye 17, and couples with protector cap 12 at loop 14. Preferably these couplings from spring 15 to hook 16 and protector cap 12 are permanent couplings that are flexible, permitting more easy manipulation without fear of separation. Spring 15 provides an elastic tension force that draws protector cap 12 towards hook 16, which in turn is anchored to gas lines 4 through hook 18. Consequently, when protector cap 12 is operatively installed onto torch tip 6, such as illustrated in FIG. 3, then the tension generated in spring 15 draws protector cap 12 against torch tip 6 and thereby retains protector cap 12 on torch tip 6. With reasonable dimensioning of protector cap 12, spring 15, and hook 16, sufficient tension will be generated within spring 15 to retain protector cap 12 in place about torch tip 6 during transport. In this arrangement, hook 16 is operatively secured to at least one of the gas lines 4, which preferably includes oxygen gas line, acetylene gas line, and oxygen cutting gas line.

While a spring 15 is illustrated, the purpose of spring 15 is simply to generate tension drawing protector cap 12 towards hook 16, and so any suitable elastic member may be used to generate a desired tension force. For exemplary purposes only, and not limiting the invention solely thereto, other apparatus such as rubber or other elastomeric or elastic cords or bands, shock cords, or any other suitable devices or apparatus may be used in place of spring 15. Preferably, if such alternative apparatus are used, they will be fabricated from relatively heat resistant materials. Nevertheless, owing to the potential for elevated temperatures, a metal spring is preferred and will provided desirable durability.

With the provision of an elastic member such as spring 15 and an anchor or coupler such as hook 16, the dimensions and geometry of protector cap 12 are not as critical, and so for exemplary purposes, in an alternative embodiment it is possible to construct protector cap 12 from a capped cylindrical tube. While such a tube is less desired, since only a small seal ring will be formed near the open end of protector cap 12, there are instances where such an alternative embodiment will be preferred.

When torch tip protector 10 is not operatively protecting torch tip 6, hook 16 and protector cap 12 may be wound in opposite directions around gas line 4 or other suitable member of torch 1, and then hook 18 engaged with loop 14 to form a secured wrap. This allows torch tip protector to be stored when not in use, but to still be affixed to torch 1 without the need for any further components.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:
1. In combination, an oxygen and acetylene cutting torch and a torch tip protector,
    said oxygen and acetylene cutting torch comprising:
        a source of oxygen torch gas;
        a source of acetylene torch gas;
        a conical torch tip having a plurality of ports through which said oxygen and acetylene torch gasses pass and exit said gas torch prior to combustion;
        an oxygen gas line coupling said oxygen gas source with said torch tip;
        an acetylene gas line coupling said acetylene gas source with said torch tip; and
        an oxygen cutting gas line coupling said oxygen gas source with said torch tip;
    said torch tip protector comprising:
        a protector cap having a generally disc-shaped base, a truncated conical side wall in combination with said disc-shaped base defining an open-topped cup, said truncated conical side wall operatively engaging said conical torch tip and thereby securely engaging thereto;

a hook operatively securing to and manually removable from at least one of said oxygen gas line, said acetylene gas line, and said oxygen cutting gas line;

a spring coupling said hook with said protector cap and thereby during transport operatively retaining said protector cap on said conical torch tip when said hook is operatively secured to said at least one of said oxygen gas line, said acetylene gas line, and said oxygen cutting gas line and said protector cap is operatively engaging said conical torch tip.

2. The combination oxygen and acetylene cutting torch and torch tip protector of claim 1, wherein said hook, spring, and protector cap each further comprises metal, thereby providing resistance to heat induced damage during use.

3. The combination oxygen and acetylene cutting torch and torch tip protector of claim 1, wherein said spring is coupled to said hook and said protector cap through permanent and flexible couplings.

4. A gas torch having a source of torch gas, a torch tip through which said torch gas passes and exits said gas torch prior to combustion, and at least one gas line coupling said gas source with said torch tip, wherein the improvement comprises:

a torch tip cover operatively encompassing said torch tip and thereby operatively blocking access to said torch tip;

a coupler engaging with said at least one gas line; and an elastic member coupled with said coupler and distally thereto with said torch tip cover to elastically draw said torch tip cover into secure engagement with said torch tip.

5. The gas torch of claim 4, wherein said torch tip cover is conical.

6. The gas torch of claim 4, wherein said torch tip cover, elastic member and coupler are fully separable from a remainder of said gas torch.

7. The gas torch of claim 4, wherein said torch tip cover further comprises a body terminating at a first end with a base and open at a second end distal to said first end to operatively engage with a conical torch tip.

8. The gas torch of claim 7, wherein said base further comprises a generally disc-shaped plate.

9. The gas torch of claim 4, wherein said body further comprises a truncated cone.

10. The gas torch of claim 4, wherein said coupler further comprises a hook.

11. The gas torch of claim 4, wherein said elastic member further comprises a spring.

12. The gas torch of claim 4, wherein said torch tip cover, said coupler and said elastic member each further comprise metal, thereby providing resistance to heat induced damage during use.

* * * * *